United States Patent

Rezzouk

Patent Number: 5,832,116
Date of Patent: Nov. 3, 1998

[54] METHOD OF EXTRACTING TWO EDGES OF A ROAD BY ACTIVE CONTOUR PROPAGATION

[75] Inventor: Jamal Rezzouk, Orsay, France

[73] Assignee: Alcatel Alsthom Compagnie Generale d'Electricite, Paris, France

[21] Appl. No.: 782,670

[22] Filed: Jan. 15, 1997

[30] Foreign Application Priority Data

Jan. 16, 1996 [FR] France ............................ 96 00424

[51] Int. Cl.$^6$ .............................. G06K 9/48; G06K 9/00; G06K 9/40
[52] U.S. Cl. .................. 382/199; 382/104; 382/128; 382/266
[58] Field of Search .................... 382/104, 199, 382/266, 242, 316, 128

[56] References Cited

U.S. PATENT DOCUMENTS 4,906,940  3/1990  Greene et al. ........................... 382/100

FOREIGN PATENT DOCUMENTS

0626655A3  11/1994  European Pat. Off. .

OTHER PUBLICATIONS

P. Fua et al, "Model driven edge detection", *Machine Vision and Applications*, Winter 1990, USA, vol. 3, No. 1, ISSN 0932–8092, pp. 45–56.

*Primary Examiner*—Leo H. Boudreau
*Assistant Examiner*—Dmitry A. Novik
*Attorney, Agent, or Firm*—Sughrue, Mion, Zinn, Macpeak & Seas, PLLC

[57] ABSTRACT

A method of extracting the contour of an object having two lateral edges, for example a road, from a digitized photographic image using an automatic active contour propagation process, comprises the steps of entering first and second initial contours near respective lateral edges of the object in the image. The first initial contour is propagated by means of a first automatic active contour propagation process and the second initial contour is propagated by means of a second active contour propagation process. Each propagation process uses, firstly, an energy model including a term relating to elastic coupling forces between paired points of the first and the second initial contours and, secondly, a direction of prolongation of the active contour defined as an average of two prolongation directions determined for the first and the second active contours, respectively.

2 Claims, 3 Drawing Sheets

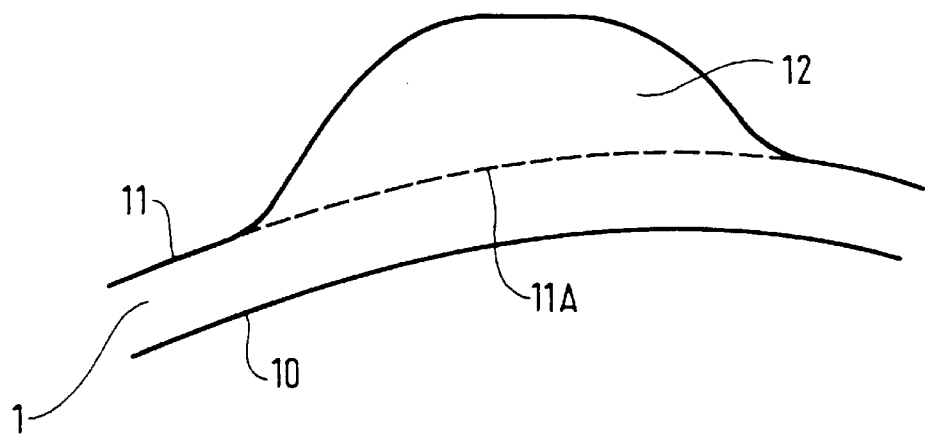
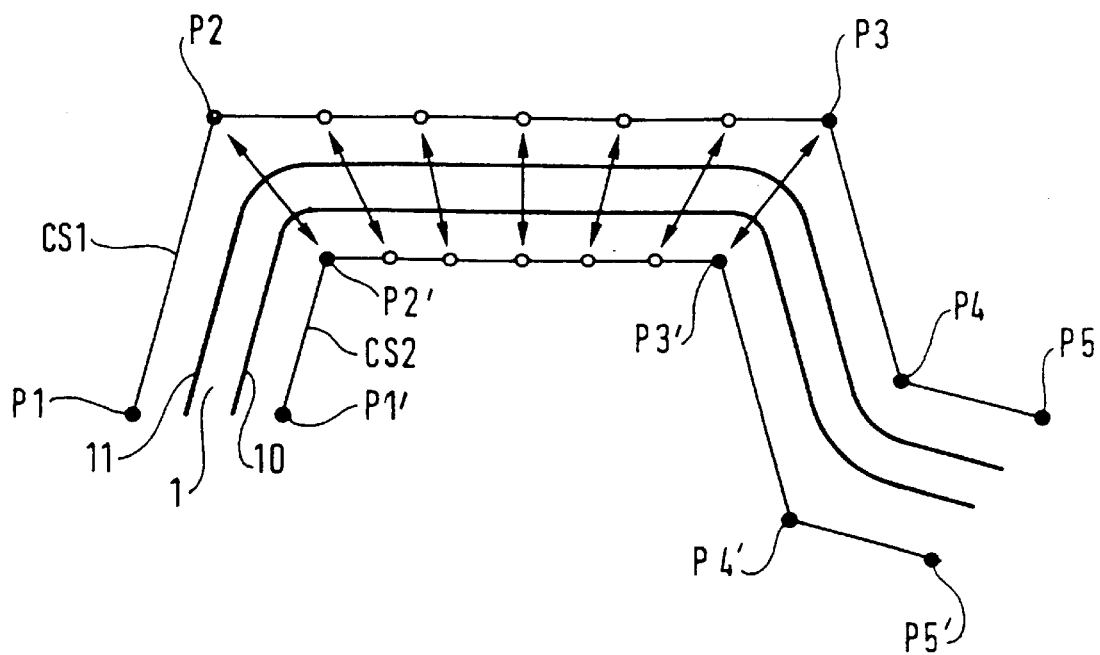

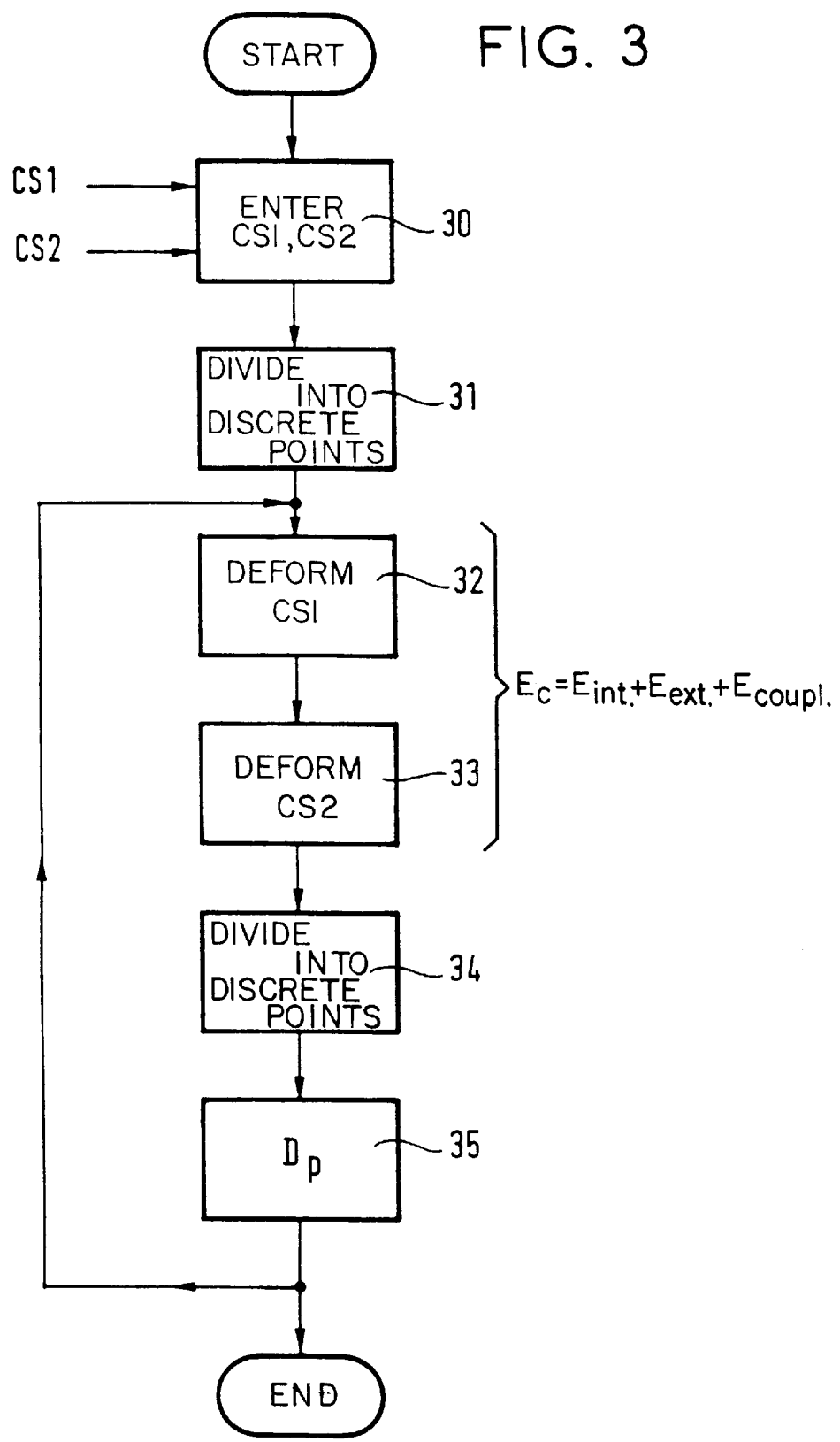

$$\vec{F}_{di} = +k\left(\frac{d_i - D}{d}\right)^p \frac{\vec{V}_i}{d_i}$$

$$\vec{T}_{di} = +\kappa\left(\frac{\delta_i}{\delta}\right)^\pi \vec{N}_i$$

→ DEFORM CS1 — 32

$$\vec{F}_{gi} = -k\left(\frac{d_i - D}{d}\right)^p \frac{\vec{V}_i}{d_i}$$

$$\vec{T}_{gi} = -\kappa\left(\frac{\delta_i}{\delta}\right)^\pi \vec{N}_i$$

→ DEFORM CS2 — 33

<u>A</u>

<u>B</u>

METHOD OF EXTRACTING TWO EDGES OF A ROAD BY ACTIVE CONTOUR PROPAGATION

BACKGROUND OF THE INVENTION

1. Field of the Invention

The invention concerns a method of extracting the contour of an object from a digitized photographic image using an automatic active contour propagation process. The invention is more particularly concerned with a method of extracting two edges of a road shown in an aircraft or satellite photographic image using a process of the above kind.

2. Description of the Prior Art

A method of extracting the two edges of a road using an automatic active contour propagation process is already known from the article "Model driven edge detection"—P. Fua and Y. G. Leclerc—Machine Vision and Applications, 3:45–56, 1990.

In this prior art method, an initial contour is entered into the image (displayed on a screen) between the two edges of the road to be extracted and this initial contour is deformed and lengthened by an automatic active contour propagation process seeking an equilibrium position of the active contour, this equilibrium position corresponding to a minimum energy at the points of the active contour in a field of constraints.

In the case of the prior art method mentioned above, the active contour propagation process integrates a width parameter associated with the initial contour, this parameter defining the active contour as a ribbon of constant width. The two edges of the ribbon defined by this parameter are taken into account in seeking the energy minimum in the following manner. The energy mathematical model includes, firstly, an internal (or geometrical) energy term defined as the sum of the internal energies respectively calculated at points of both edges of the ribbon and an external (or photometric) energy term defined as the sum of the external energies respectively calculated at points of both edges of the ribbon. It will be remembered that the internal energy of an active contour is derived from constraints related to the stiffness and elasticity characteristics imposed on the active contour whereas the external energy of an active contour is derived from constraints tied to the photometric characteristics of the image. An expression for these energy terms is given in detail in the article "Using Dynamic Programming for Minimizing the Energy of Active Contours in the Presence of Constraints"-Amir A. Amini et al-IEEE Second Int. Conference on Computer Vision, p 95–99, 5 Dec. 1988, Tampa (Fla). In addition to the two energy terms mentioned above, the energy model in this prior art method includes an energy term relating to forces tending to maintain the width of a ribbon at a constant value when it is deformed. A method of this kind is suitable for situations in which the two edges to be extracted appear in the image with a constant distance between them, regardless of the value of this distance.

Situations are encountered, in particular because of the increasing resolution of satellite-borne cameras, in which the edges delimiting a road in the image are confused with the perimeter of areas of shadow, of parking areas, etc. In this case, the distance between the two edges appearing in the image varies greatly. Application of the prior art method mentioned above to this type of image requires manual intervention to correct the drift of the propagation process, in particular at places where the two edges appearing in the image are separated by a distance much greater than the width of the ribbon.

The aim of the invention is to propose a solution to this problem.

SUMMARY OF THE INVENTION

To this end, the invention consists in a method of extracting the contour of an object having two lateral edges, for example a road, from a digitized photographic image using an automatic active contour propagation process, comprising the steps of:

entering first and second initial contours near respective lateral edges of said object in said image, propagating said first initial contour by means of a first automatic active contour propagation process and said second initial contour by means of a second active contour propagation process, using for each propagation process, firstly, an energy model including a term relating to elastic coupling forces between paired points of said first and said second initial contours and, secondly, a direction of prolongation of said active contour defined as an average of two prolongation directions determined for said first and said second active contours, respectively.

In a method of this kind, the propagation process for extracting one edge of the road may be controlled separately from the propagation process for extracting the other edge of the road, in particular by different settings of the internal energy term parameters used in the two processes. In this way it is possible to obtain a different deformation (stiffness and elasticity) behavior for both active contours in order to match them to the specifics of the opposite edges of the road to be extracted. In this way it is possible for one of the active contours to contribute more strongly to the determination of the common prolongation direction. Finally, it will be realized that deformations of one of the two active contours can be imposed on the other through the energy term representative of coupling between the two active contours.

The method of the invention is described hereinafter with reference to the drawings.

BRIEF DESCRIPTION OF THE DRAWINGS

FIG. 1 shows one example of an image in which two edges of a road to be extracted appear.

FIG. 2 illustrates the input of two initial contours.

FIG. 3 is a simplified flowchart illustrating the various processing steps of the method of the invention.

DETAILED DESCRIPTION OF THE PREFERRED EMBODIMENT

Figure 4:
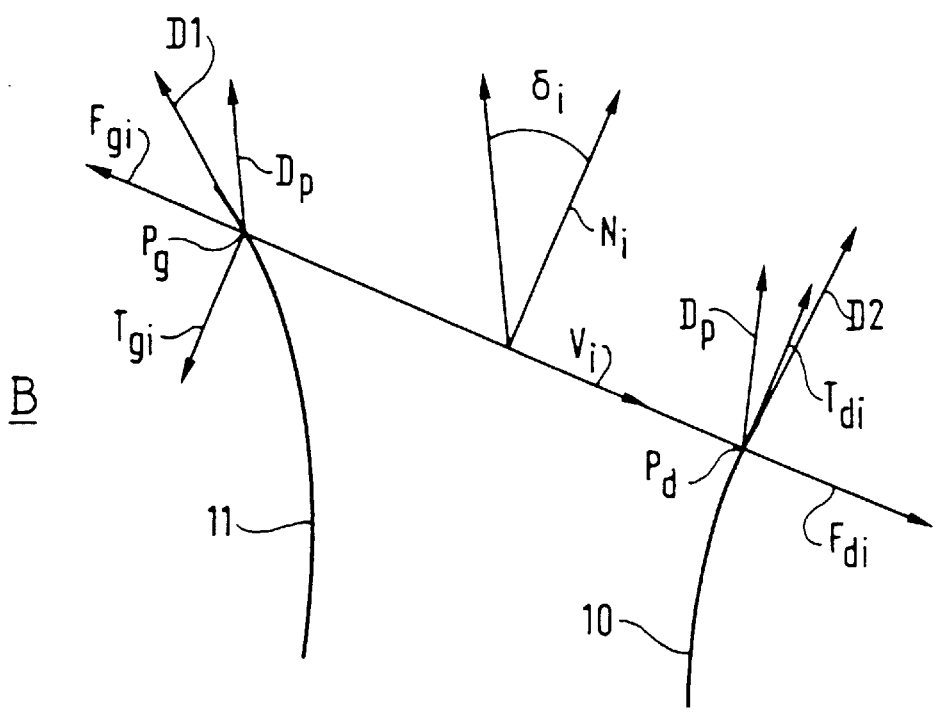
FIG. 4A gives an expression for the elastic coupling forces operative in the two active contour propagation processes.
FIG. 4B is a diagram showing the orientation of these elastic coupling forces at two paired points and the common direction of prolongation of the two active contours.

The method of the invention is adapted to extract the contour of an object having two lateral edges even if the two edges in the image feature discontinuities of their parallel relationship, i.e. are separated from each other by a varying amount.

The method of the invention is more particularly suited to extracting the two edges of a road from an aircraft or satellite image. The invention could find an application in other fields, for example, medical imaging.

FIG. 1 is a diagram showing one example of an image in which there appear two edges 10 and 11 of a road 1 that move apart from each other in an area 12 corresponding in this instance to a parking area.

The method of the invention is adapted to extract the edge 11 of the road, automatically isolating it at 11A from the parking area.

FIG. 3 shows the main processing steps of the method of the invention. At the start, a digitized image in which the edges of a road to be extracted appear, like the FIG. 2 image, is displayed on a screen of a workstation (not shown).

In step 30 in FIG. 3 a first initial contour CS1 and a second initial contour CS2 are entered, for example using a pointing device on the screen, respectively near the lefthand edge 11 and the righthand edge 10 of the road 1 shown in FIG. 2.

These two initial contours CS1 and CS2 comprise respective series of successive straight line segments each defined by a set of image points, points P1 through P5 for CS1 and points P1' through P5' for CS2.

In step 31, the two initial contours CS1 and CS2 are divided into discrete points and the discrete points of the two initial contours are paired. The increment between discrete points is a variable parameter for the processor step 31. As the two initial contours do not necessarily have exactly the same length, the following procedure is used to divide each initial contour into discrete points. The process starts from two pairs of points already paired, for example the pairs (P2, P2') and (P3, P3'). The longest segment on an initial contour is looked for. In this example, this is the segment P2–P3. This segment is divided into discrete points using the increment entered as a parameter. The number of discrete points generated for this segment is used to calculate the increment for the shortest segment P2'–P3' in order to generate an identical number of discrete points for this segment. The discrete points are then paired. FIG. 2 shows a set of discrete points generated between the points P2 and P3 of the contour CS1 and a set of discrete points generated between P2' and P3' of the contour CS2. The arrows in FIG. 2 show how the discrete points are paired with the image points entered on the screen using the pointing unit.

Then the first initial contour CS1 is propagated using a first automatic active contour propagation process and the second initial contour CS2 is propagated using a second automatic active contour propagation process to obtain final contours that correspond to the edges of the road to be extracted. Note that these two propagation processes are iterative processes and, by convention, the active contour at the stage of one iteration is referred to as the current contour.

In step 32, the first initial contour (or the first current contour) CS1 is deformed by a deformation function of the first propagation process and in step 33 the second initial contour (or the second current contour) is deformed by a deformation function of the second propagation process. Each deformation function uses an energy model $E_c$ including, in addition to conventional internal energy and external energy terms $E_{int}$ and $E_{ext}$, an energy term $E_{coupl}$ relating to elastic coupling forces between the paired points of the two current contours (at the start the two initial contours).

On each iteration, or after a certain number of iterations (when the distance between two consecutive points of either of the current contours becomes less than a particular threshold), the two current contours are divided into discrete points in step 34 and the discrete points of the two current contours are paired as described for step 31.

In step 35, the two current contours are made longer in a common prolongation direction defined as the average of two conventionally determined prolongation directions, one for each current contour.

For a new iteration the process resumes from step 32 until the current contours in the steps 32 and 33 correspond to the edges of the road to be extracted.

The elastic coupling forces in question include a linear elastic force F which acts like a linear spring to maintain any two paired points at a certain distance and a torsion elastic force T which acts like a coil spring to prevent relative slipping between the two paired points. Finally, the energy term relating to these coupling forces is operative for a virtually constant distance between the two current contours, avoiding relative slipping of one relative to the other.

FIG. 4A shows an expression for the elastic forces F and T at two paired points of the current contours.

The linear elastic force F is oriented along a straight line segment passing through the paired points $P_g$ and $P_d$ in FIG. 4B and is expressed by the following formula:

$$\vec{F}_i = \pm k \left( \frac{d_i - D}{d} \right)^p \frac{\vec{V}_i}{d_i}$$

in which $V_i$ is the vector defined by ith pair of paired discrete points, $d_i$ is the normal to the vector $V_i$, D is the distance for which the linear elastic force cancels out, k is a linear spring elasticity multiplication constant, p is a linear spring elasticity power constant, and d is a linear spring regulation constant.

The torsion elastic force T is oriented in a direction perpendicular to the straight line segment passing through the two paired discrete points. It is expressed by the following formula:

$$\vec{T}_i = \pm \kappa \left( \frac{\delta_i}{\delta} \right)^\pi \vec{N}_i$$

in which $N_i$ is the normalized vector orthogonal (direct sense) to $V_i$ $\delta_i$ is the angle between $N_i$ and the bisector of the tangents to the two current contours at the ith discrete point, κ is a torsion multiplication constant, π is a coil spring power constant, and δ is a coil spring regulation angle constant.

Note that the linear and torsion elastic forces $F_{di}$ and $T_{di}$ used for the energy model of the first active contour propagation process 32 are of the opposite sign to the linear and torsion forces $F_{gi}$ and $T_{gi}$ used for the energy model of the second active contour propagation process 33.

FIG. 4B shows the direction $D_p$ of prolongation common to the two active contour propagation processes 32 and 33. This direction $D_p$ is the average of two prolongation directions D1 and D2 respectively determined for the current contour of the first propagation process 32 (lefthand contour) and the current contour of the second propagation process 33 (righthand contour).

There is claimed:

1. A method of extracting the contour of an object having two lateral edges, for example a road, from a digitized photographic image using an automatic active contour propagation process, comprising the steps of:

entering first and second initial contours near respective lateral edges of said object in said image, propagating said first initial contour by means of a first automatic active contour propagation process and said second initial contour by means of a second active contour propagation process, using for each propagation process, firstly, an energy model including a term relating to elastic coupling forces between paired points of said first and said second initial contours and, secondly, a direction of prolongation of said active contour defined as an average of two prolongation directions determined for said first and said second active contours, respectively.

2. The method claimed in claim 1 wherein said elastic coupling forces between two paired points of said initial contours include a linear elastic force oriented along a straight line segment passing through said two paired points and a torsion elastic force oriented perpendicularly to said straight line segment.

\* \* \* \* \*